(12) United States Patent
Drew

(10) Patent No.: US 6,557,880 B2
(45) Date of Patent: May 6, 2003

(54) MULTIWHEEL SELF PROPELLED VARIABLE OUTPUT VEHICLE

(76) Inventor: Walter Brooks Drew, 5600 Kapp Rd., Pfafftown, NC (US) 27040

( * ) Notice: Subject to any disclaimer, the term of this patent is extended or adjusted under 35 U.S.C. 154(b) by 20 days.

(21) Appl. No.: 09/891,764

(22) Filed: Jun. 27, 2001

(65) Prior Publication Data

US 2003/0025293 A1 Feb. 6, 2003

(51) Int. Cl.$^7$ ................................................ B62M 1/02
(52) U.S. Cl. ....................................... 280/259; 280/221
(58) Field of Search ................................. 280/252, 253, 280/259, 260, 261, 220, 256, 221, 222

(56) References Cited

U.S. PATENT DOCUMENTS

| | | | | |
|---|---|---|---|---|
| 427,110 | A | * 5/1890 | Quevedo | |
| 1,750,187 | A | * 3/1930 | Miller et al. | |
| 2,466,105 | A | * 4/1949 | Hoffman | |
| 3,006,659 | A | * 10/1961 | Krasnoff et al. | |
| 5,066,031 | A | * 11/1991 | Rinkewich | 280/221 |
| 5,192,089 | A | * 3/1993 | Taylor | 280/221 |
| 5,294,140 | A | * 3/1994 | Rinkewich | 280/221 |
| 5,368,321 | A | * 11/1994 | Berman et al. | 280/221 |
| 6,209,900 | B1 | * 4/2001 | Yoshizawa | 280/252 |

FOREIGN PATENT DOCUMENTS

WO 93/24359 * 12/1993

* cited by examiner

Primary Examiner—Avraham Lerner

(57) ABSTRACT

A multiwheel self propelled variable torque output vehicle has at least one front and one rear wheel with power being supplied to a rear wheel by a pair of reciprocating pedal levers having a non-slip surface material connected to engaging lever arms. The rear wheel has an axle and bearing, and the pedal levers engage the chassis through slots permitting slidable movement of the pedal levers with respect to the chassis. Force is exerted by the rider against the pedal levers to displace the lever arms and rotate the rear wheel. Torque applied and speed attained depend upon the location on the pedal levers where force is applied. Assuming a level riding surface, greater torque is developed when force is applied at one end of the pedal levers and greater speed is attained when less torque is developed at the other pedal lever ends. Horizontal and vertical force can be utilized to drive the vehicle with horizontal force alone capable of driving the vehicle when the force is applied at one end of the pedal levers directly over the pedal lever slots. Several embodiments utilize the invention including a tandem vehicle to accommodate more than one rider.

16 Claims, 4 Drawing Sheets

MULTIWHEEL SELF PROPELLED VARIABLE OUTPUT VEHICLE

BACKGROUND OF THE INVENTION

1. Field of the Invention

The present invention relates generally to manually powered vehicles or cycles and more particularly to a multiwheel variable torque output vehicle powered by a pair of reciprocating and slidable pedal levers.

2. Description of the Prior Art

Conventional pedal driven vehicles depend primarily upon a fixed position pedal assembly where the pedals are fixedly and rotatably secured to the chassis of the vehicle. Power is thus supplied by depressing and rotatably moving the pedals in a circular motion to either directly drive one or more wheels of the vehicle or indirectly drive such wheels through the use of various gearing assemblies. There are a number of such vehicles that employ variable transmissions, however these do not involve slidable movement of the power producing pedals. They usually utilize a shifter plate or similar device to change the output torque driving the vehicle. In some instances a driving disc utilizing radial slots is employed.

In all cases, the variable output device is complicated and expensive. Moreover, these devices are somewhat fragile and must be carefully maintained to ensure proper operation. There is perceived a need for a variable torque self propelled vehicle such as a scooter or cycle that is simple in construction, reliable in operation and economical to fabricate. It is to this perceived need that the present invention is directed.

SUMMARY OF THE INVENTION

The present invention may be employed in a scooter, bicycle, tricycle or other multiwheel vehicles. It has a chassis and, in preferred form, a front and rear wheel mounted on the chassis. A steering device controls the front wheel, and a pair of reciprocating pedal levers are slidably connected to the chassis for applying power to the rear wheel. A pair of lever arms engage the pedal levers at one end and the chassis at the other end through slots that enable slidable communication therewith. The pedal levers respond to force applied by the rider proximate and between the pedal lever ends to develop variations in torque and vehicle speed depending on the location along the pedal levers where force is applied. Assuming a level riding surface, the pedal levers develop high torque and low speed when force is applied at one pedal lever end and low torque and high speed when force is applied to the other pedal lever end. The torque and speed decrease and increase progressively as force is applied progressively from the one pedal lever end to the other pedal lever end and increase and decrease progressively as force is applied progressively from the other pedal lever end to the one pedal lever end.

A combination of vertical and horizontal force is applied to the pedal levers with horizontal force alone capable of displacing the pedal levers and driving the vehicle when the force is applied at a end of the pedal levers directly over the pedal lever slots.

Several embodiments of vehicles incorporate the invention including a tandem vehicle to accommodate more than one rider.

From the preceding summary it can be seen that a primary objective of the present invention is to provide a self propelled variable torque output vehicle that includes all of the advantages of prior art devices and more and none of the disadvantages.

Another objective of the present invention is to provide a vehicle of the type described that is simple in construction, easy to operate and reatively inexpensive.

A further objective of the present invention is to provide a vehicle of the type described that incorporates slidable pedal levers to provide power for driving the vehicles.

Yet another objective of the present invention is to provide a vehicle of the type described that will accommodate more than one rider. Still another objective of the present invention is to provide a variable output device that can be retrofitted to a conventional bicycle.

Thus there has been outlined the more important features of the invention in order that the detailed description that follows may be better understood and in order that the present contribution to the art may be better appreciated. There are, of course, additional features of the invention that will be described hereinafter and which will form the subject matter of the claims appended hereto. In that respect, before explaining at least one embodiment of the invention in detail, it is to be understood that the invention is not limited in its arrangement of the components set forth in the following description and illustrated in the drawings. The invention is capable of other embodiments and of being practiced and carried out in various ways.

It is also to be understood that the phraseology and terminology employed herein are for the purpose of description and should not be regarded as limiting in any respect. Those skilled in the art will appreciate that the concept upon which this disclosure is based may readily be utilized as a basis for designing other structures, methods and systems for carrying out the several purposes of this development. It is important that the claims be regarded as including such equivalent methods and products resulting therefrom that do not depart from the spirit and scope of the present invention. The application is neither intended to define the invention, which is measured by its claims, nor to limit its scope in any way.

Thus, the objects of the invention set forth above, along with the various features of novelty which characterize the invention, are noted with particularity in the claims annexed to and forming a part of this disclosure. For a better understanding of the invention, its operating advantages and, the specific results obtained by its use, reference should be made to the following detailed specification taken in conjunction with the accompanying drawings wherein like characters of reference designate like parts throughout the several views.

The drawings are included to provide a further understanding of the invention and are incorporated in and constitute a part of the specification. They illustrate embodiments of the invention and, together with their description, serve to explain the principles of the invention.

DETAILED DESCRIPTION OF PREFERRED EMBODIMENT

Figure 1:
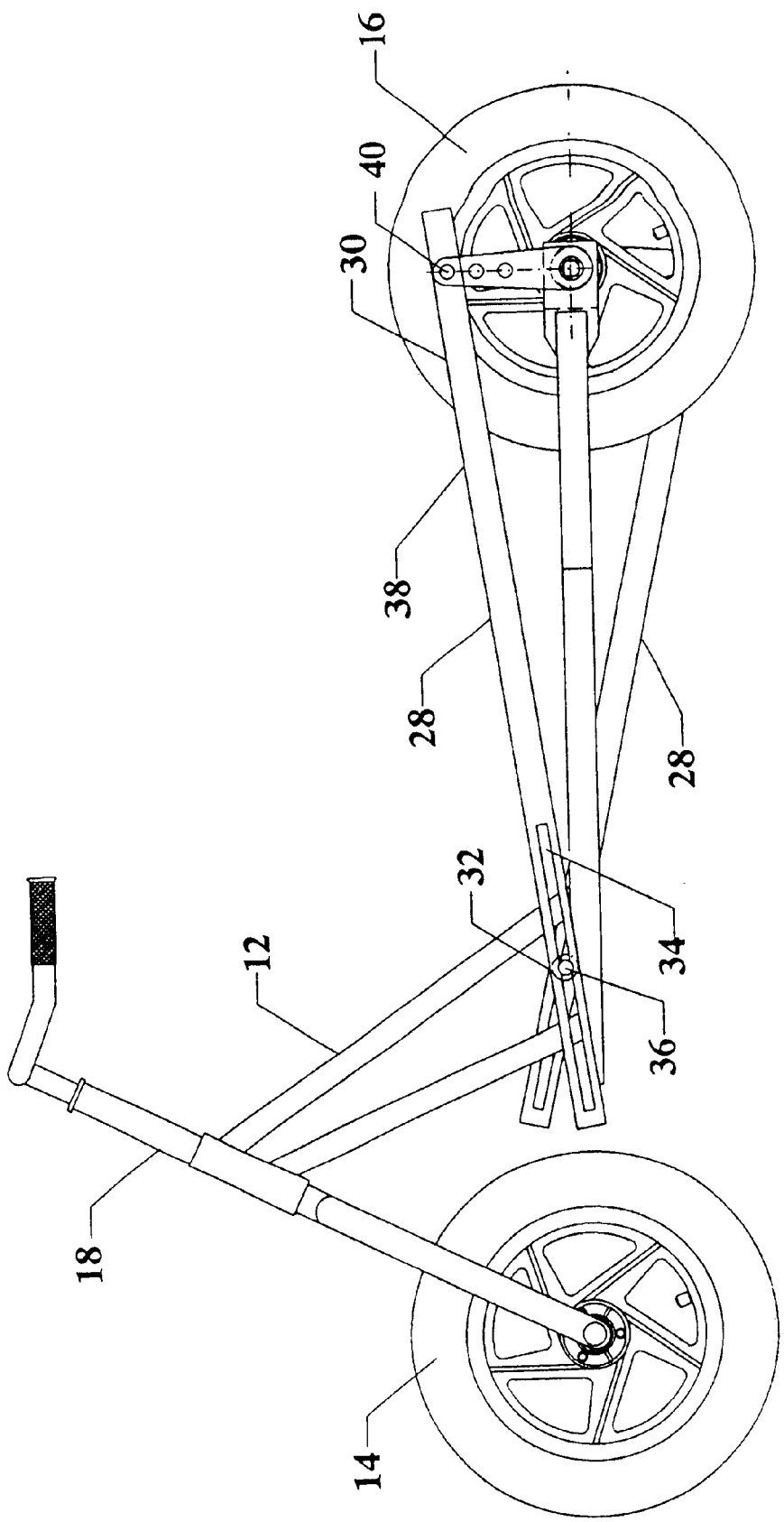
FIG. 1 is a side elevational view of a primary embodiment of the present invention.

Referring now to the drawings and particularly to FIG. 1, a multiwheel vehicle such as a scooter shown generally as 10 has a chassis 12, a front wheel 14, and a rear wheel 16. A steering column 18 connects with chassis 12 and front wheel 14. Rear wheel 16 has an axle 20 supported by a bearing 22, and a pair of lever arms 24 connect in an appropriate manner to drive rear wheel 16. Bearing 22 may be free wheeling or non-freewheeling and may be installed within the hub 26 of rear wheel 16 or in chassis 12.

A pair of reciprocating and slidable pedal levers 28 with an applied non-slip surface material 38 connect to lever arms 24 at one pedal arm end 30 as shown. The other pedal lever end 32 has slots 34 that cooperatively receive a lug or axle 36 so that slidable movement of pedal levers 28 with respect to chassis 12 takes place during the operation of scooter 10.

Operation takes place when force is exerted by the rider against pedal levers 28 to displace lever arms 24 and rotate rear wheel 16. Torque applied and speed attained depend upon the location on the surface of pedal levers 28 where force is applied. Assuming a level riding or travel surface, greater torque is developed and lesser speed is reached when force is applied at one end 30 of pedal levers 28. Conversely, greater speed is achieved and less torque developed when force is applied at the other pedal lever ends 32. As an example, force applied to pedal lever ends 30 develops maximum torque with a corresponding minimum speed. As force is progressively applied in the direction of pedal lever 32, the developed torque is reduced and vehicle speed is increased. The application of force progressively in incremental distances gradually reduces the torque developed and increases the speed achieved until minimum torque and maximum speed are reached at pedal lever end 32.

Obviously variations in torque and speed arise when load conditions on the vehicle or inclined or irregular travel surfaces occur. Going up hill will require the rider to remain near pedal lever end 30 where maximum torque is developed.

Horizontal and vertical force is normally applied to reciprocate and slidably displace pedal levers 28 and propel vehicle 10. Propulsion of vehicle 10 by horizontal force alone occurs when force is applied at pedal lever end 32 directly over pedal lever slots 34.

Figure 2:
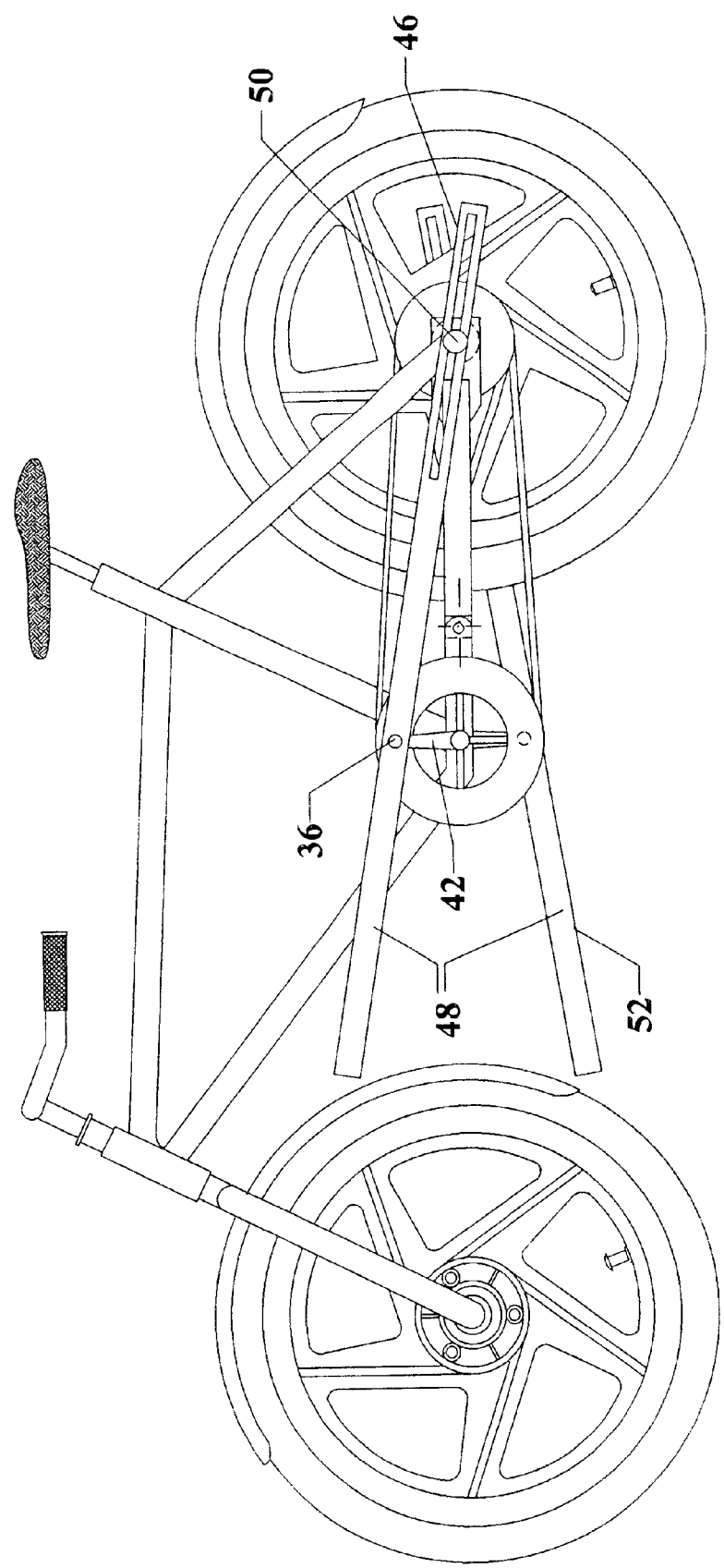
FIG. 2 is a side elevational view of an alternative embodiment of the present invention with the slotted pedal levers attached to the rear wheel axle.

FIG. 2 illustrates another embodiment of the present invention wherein the pedal lever/lever arm assembly shove generally as 36 is reversed so that rotatable lever arms 42 are positioned toward the front of vehicle 44 and the slotted end 46 of pedal levers 48 are connected at or near the rear wheel axle 50. Operation is essentially the same as previously described except an additional pedal lever length 52 is provided that enables the rider to apply more force and develop greater torque than that achieved in the previous embodiment.

Figure 3:
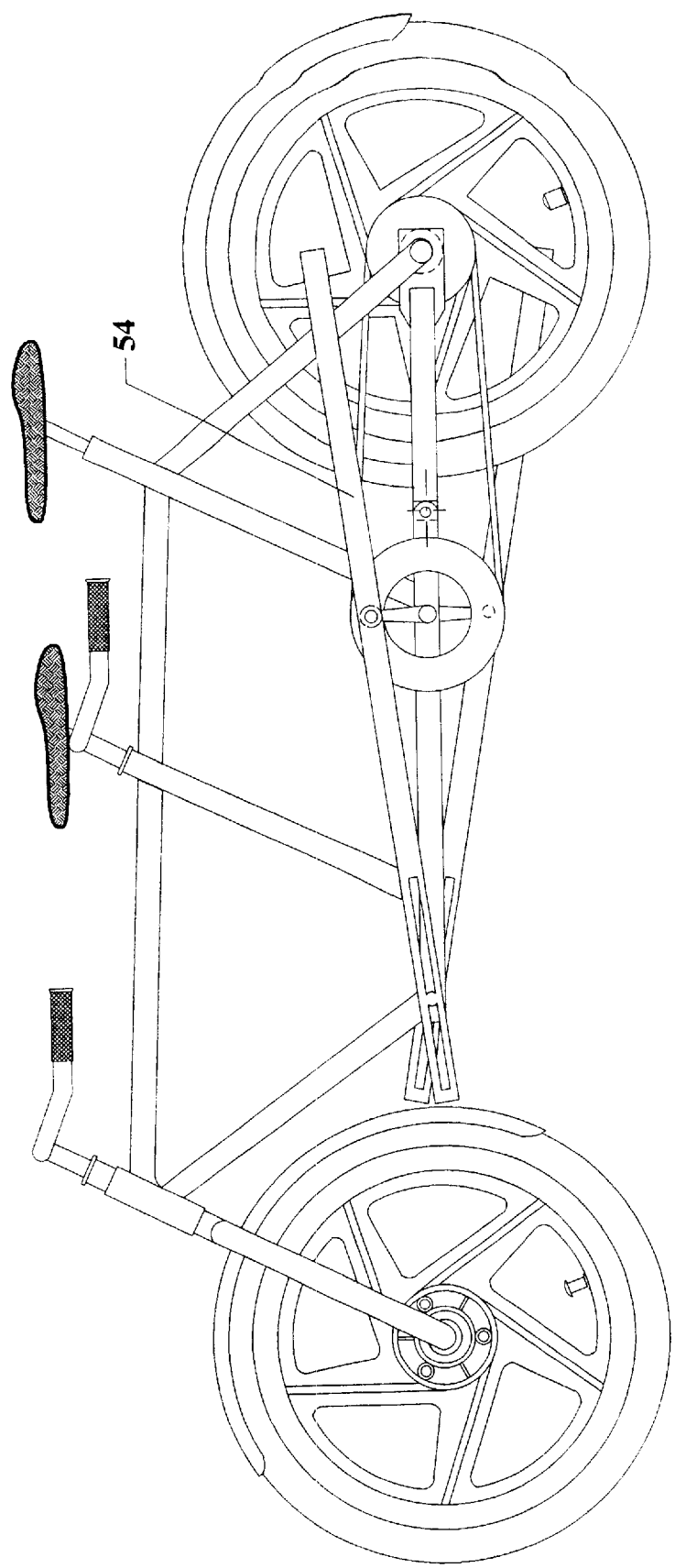
FIG. 3 is a side elevational view of the present invention utilized in a tandem vehicle.

FIG. 3 illustrates another variation of the embodiment shows in FIG. 2 where a tandem vehicle is provided to comfortably accommodate a second rider. The extended pedal lever length 54 is particularly helpful here where the additional weight of a second rider increases the vehicle load.

Figure 4:
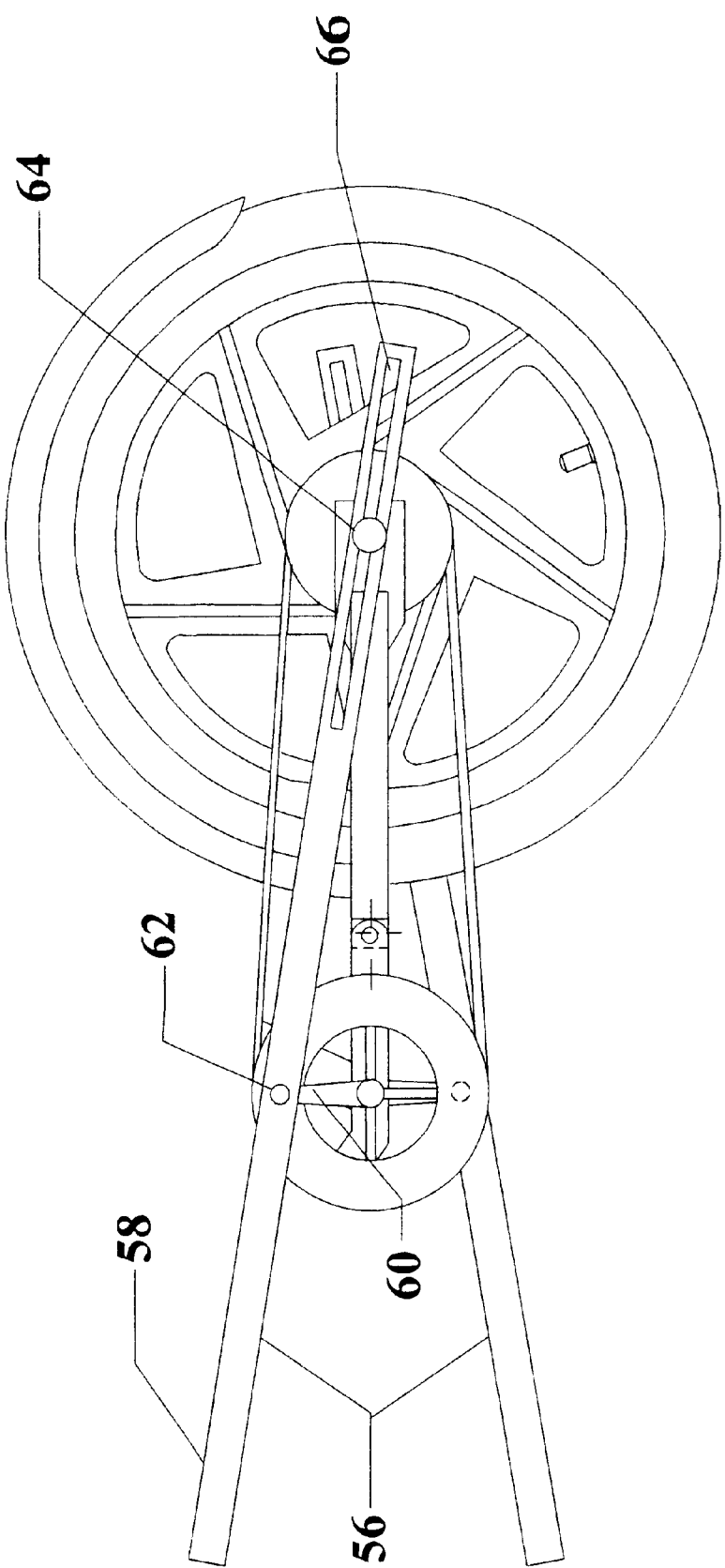
FIG. 4 is a side elevational view of retrofit device embodying the present invention which can be installed on a conventional bicycle.

FIG. 4 illustrates a bicycle retrofit device embodying the present invention. Here the pedal lever/lever arm device 56 can be installed on a conventional bicycle by fitting bearing assembly 62 to the extending bicycle sprocket lever arm 60 and connecting a bearing means 64 to the existing axle end.

From the preceding description, it can be seen that a multiwheel self propelled variable torque output vehicle has been provided that still meet all of the advantages of prior art devices and offer additional advantages not heretofore achievable. With respect to the foregoing invention, the optimum dimensional relationship to the parts of the invention including variations in size, materials, shape, form, function, and manner of operation, use and assembly are deemed readily apparent to those skilled in the art, and all equivalent relationships illustrated in the drawings and described in the specification are intended to be encompassed herein.

The foregoing is considered as illustrative only of the principles of the invention. Numerous modifications and changes will readily occur to those skilled in the art, and it is not desired to limit the invention to the exact construction and operation shown and described. All suitable modifications and equivalents that fall within the scope of the appended claims are deemed within the present inventive concept.

What is claimed is:

1. A multi-wheel self propelled vehicle comprising: a chassis; at least one front wheel mounted on the chassis having an axle; at least one rear wheel mounted on the chassis having an axle and bearing means; a steering column mounted to the at least one front wheel; a pair of reciprocating pedal levers connected to the chassis having first and second ends for applying power to the at least one rear wheel; at least one pair of lever arms having first and second ends, each lever arm connected at one end to engage the at least one rear wheel axle and bearing means and at the other end to the pedal levers, each of the pedal levers having a slot proximate one pedal lever end to slidably communicate with the chassis, the pedal levers responding to force applied proximate and between the pedal lever first and second ends to displace the lever arms and drive the rear wheel at a high torque and low speed when applied proximate one of the ends of the pedal levers and at a progressively lower torque and higher speed when applied progressively along the pedal levers toward the other pedal lever ends.

2. The vehicle as claimed in claim 1 wherein the force applied to the pedal lever can be vertical, partially vertical and partially horizontal and totally horizontal.

3. The vehicle as claimed in claim 2 wherein the force applied to the pedal lever can be vertical, partially vertical and partially horizontal and totally horizontal.

4. The vehicle as claimed in claim 1 wherein the pedal levers have non-skid force-receiving surfaces.

5. The vehicle as claimed in claim 4 wherein the wheel bearing means is a freewheel bearing and the freewheel bearing is selectively engagable.

6. The vehicle as claimed in claim 1 wherein the wheel bearing means is a freewheel bearing and the freewheel bearing is selectively engagable.

7. The vehicle as claimed in claim 6 wherein the pedal levers have non-skid force-receiving surfaces.

8. The vehicle as claimed in claim 1 further comprising: brake means for selectively slowing and stopping the vehicle.

9. A multi-wheel self propelled vehicle comprising: a chassis; at least one front wheel mounted on the chassis; at least one rear wheel mounted on the chassis and having an axle and bearing means; a pair of reciprocating pedal levers connected to the chassis and having front and rear ends for applying power to the at least one rear heel; at least one pair of lever arms having first and second ends, each lever arm connected at the second end to engage the wheel bearing means and at the first end to the pedal levers, each of the pedal levers having a slot proximate the pedal lever front end to slidably communicate with chassis, the pedal levers responding to force applied proximate and between the pedal lever front and rear ends to displace the lever arms and drive the rear wheel at a high torque and low speed when applied proximate the rear wheel and at a progressively lower torque and higher speed when applied progressively along the pedal levers toward the front pedal lever ends.

10. The vehicle as claimed in claim 9 wherein the greatest torque and lowest speed is achieved when power is applied to the pedal lever at the pedal lever second end directly over the wheel bearing means.

11. The vehicle as claimed in claim 10 wherein the pedal levers have non-skid force-receiving surfaces.

12. The vehicle as claimed in claim 11 wherein the wheel bearing means is a freewheel bearing and the freewheel is selectively engagable.

13. The vehicle as claimed in claim 9 wherein the force applied to the pedal lever can be vertical, partially vertical and partially horizontal and totally horizontal.

14. The vehicle as claimed in claim 9 wherein the wheel bearing means is a freewheel bearing and the freewheel bearing is selectively engagable.

15. The vehicle as claimed in claim 9 further comprising: brake means for selectively slotting and stopping the vehicle.

16. The vehicle as claimed in claim 9 wherein the vehicle can receive a second rider.

* * * * *